Sept. 24, 1940.　　　　H. H. HATHAWAY　　　　2,215,613
FISHING HOOK
Filed April 4, 1938　　　2 Sheets-Sheet 1

INVENTOR
HARLOW H. HATHAWAY
Earl E Moore
ATTY.

Sept. 24, 1940.  H. H. HATHAWAY  2,215,613
FISHING HOOK
Filed April 4, 1938  2 Sheets-Sheet 2
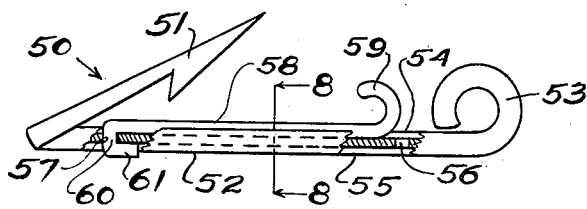
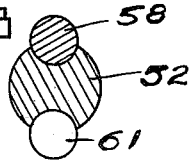
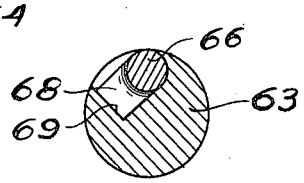
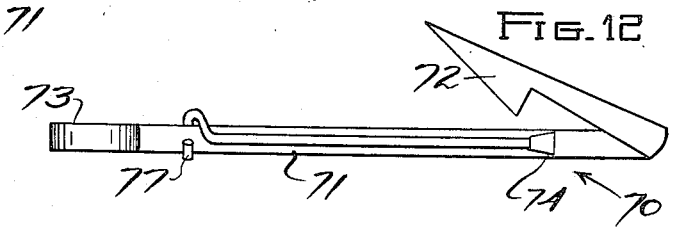
INVENTOR
HARLOW H. HATHAWAY
Earl E. Moore
ATTY.

Patented Sept. 24, 1940

2,215,613

UNITED STATES PATENT OFFICE 2,215,613

FISHING HOOK

Harlow H. Hathaway, Los Angeles, Calif.

Application April 4, 1938, Serial No. 199,923

7 Claims. (Cl. 43—40)

This invention pertains to hooks and has particular reference to fish hooks which are equipped with means for holding bait thereto. At present, the bait is damaged when placed upon the hook because in conventional hooks, it is necessary to pierce the body of the bait in order to hold it to the hook. Means are provided in applicant's hook for holding the bait clamped to the hook without injury thereto so that the bait will remain in a living and fresh condition, and in an active condition so as to be more attractive to the fish to be caught. Such a means for holding the bait to the hook would meet with favor, in particular, to those persons who are somewhat timid in baiting a hook.

The herein described invention is adapted to be applied to standard sized and typed hooks and not to interfere in any manner whatsoever with the normal and proper use of the hook. The bait is so positioned that the spears and barbs of the hook are left clear and unhampered for normal use in the art of fishing.

This invention includes tangs, wire-like splints and the like which are either fastened permanently to form part of the hook as by soldering, welding, twisting or otherwise, or are adapted to be removed from the hook and re-attached to the hook in a reverse direction should there be any advantage in so doing. Whenever it is desired to bait the hook, it is merely necessary to pull the tang part way from the hook, insert the bait, preferably the fin of the bait, and then fasten the tang securely to the hook.

Any desirable material may be used for either the tang or the hook, but in the event that the tang is made of elastic material so that it will automatically close when released, it is then preferably made of spring steel.

In order to more securely hold the bait, particularly, when the fin of the bait is fastened to the hook, it has been found advantageous to either roughen or serrate part of the hook or the tang, or both. Such a treatment of the hook or the tang will prevent the most slippery bait from escaping.

This application is a companion application to applicant's application Serial Number 185,533, filed January 18, 1938, entitled "Fish hooks."

An object of this invention is to provide a fish hook having means for holding bait securely thereto in a manner not to injure the bait so that it will be kept attractive and alluring to the fish to be caught.

Another object is to provide a fish hook designed to hold live bait in a manner that it will be indefinitely preserved for the purposes intended.

Another object is to provide means for holding the bait to the hook at certain predetermined positions commensurate with the best and most efficient use of the hook.

Other objects, advantages and features of my invention will appear from the accompanying drawings, the subjoined detailed description, the preamble of these specifications and the appended claims.

In the drawings:

Fig. 1 of the drawings shows an elevation of one form of the invention, parts being shown in section.

Fig. 7 shows an elevation, partly in section, of still another modification.

Fig. 8 shows a cross section of a portion of the hook taken substantially along the line 8—8 of Fig. 7.

Fig. 9 shows still another modification partly in section.

Fig. 10 shows a portion of the hook of Fig. 9 in plan view.

Fig. 11 shows a section taken substantially along the line 11—11 of Fig. 9.

Fig. 12 shows still another modification of the invention.

Fig. 13 shows a different view of Fig. 12 with a part in section.

Applicant has illustrated and described one of the forms of his invention in order to teach one how to make, use and vend the same, but it is to be understood that the drawings and description thereof are not to limit the invention in any sense whatsoever, except as limited by the appended claims.

Figure 1:
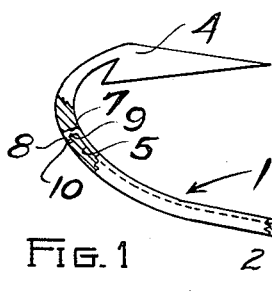

Fig. 1 of the drawings shows a form of the invention comprising a regular and standard type of fish hook designated by the reference numeral 1 having the usual shank 2 which may be straight or configurated in any manner to suit the particular use to which the hook is to be employed. At one end of the hook is the usual eyelet 3 and at the other end, the usual barbed portion 4.

The shank has along one surface thereof, a groove 5 shaped to accommodate the wire-like tang 6 which snugly fits therein. A portion of the hook is perforated as shown at 7 and is provided with a short groove-like portion 8. This end of the tang is bent as at 9 to pass through the perforation 7 and has an end thereof bent as at 10 to fit into the short groove 8. When the tang end 9 is placed in the perforation, it may then be bent at right angles to fit into the hole so that the shank part of the tang will snugly fit into the groove of the hook. The short portion 10 may then be bent to snugly fit the groove 8. Any suitable machine may be designed for the purpose of pressing the tang in the shape shown and also for punching the hole and making the grooves in the hook, but this may also be done by hand.

The other end of the tang is provided with a hook portion 11 which fits along the upper part of the shank of the hook and is releasable therefrom in a manner that is obvious.

When the tang is released from the shank by pushing the hook portion 11 therefrom, it can be pulled upwardly to make a gap between it and the hook shank which is designed to receive any portion of the bait desired to be placed in the gap for clamping to the shank of the hook. After the bait has been inserted, the tang end 11 is forced against the shank and locked in position as shown in Fig. 1.

The bending of the tang as at 9 and 10, eliminates the use of soldering and welding and provides a very good joint that will not twist or turn.

Figure 2:
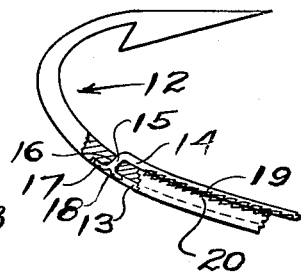
Fig. 2 shows a portion of a fish hook equipped with a modified form of the invention.
Figure 4A:
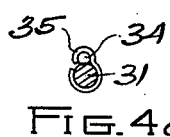
Fig. 4a shows a cross section substantially along the line 4a—4a of Fig. 4.

Fig. 2 shows a hook 12 having the usual barbs and eyelet and is grooved as shown at 13. In this form of the invention, the tang 14 has its bent end 15 inserted in a perforation 16 of the hook. The end 15 is of sufficient length to permit it to be split to form two flaps 17 and 18 which are squeezed into substantially a 180 degree angle to snugly fit into the groove 13 as shown.

In order to securely hold the bait and prevent it from slipping from between the tang 14 and the hook 12, the tang portion 19 and hook portion 20 are serrated or otherwise roughened.

Figure 3A:
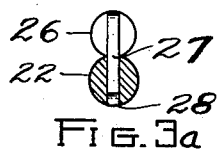
Fig. 3a shows a cross section taken substantially along the line 3a—3a of Fig. 3.
Figures 3, 4:
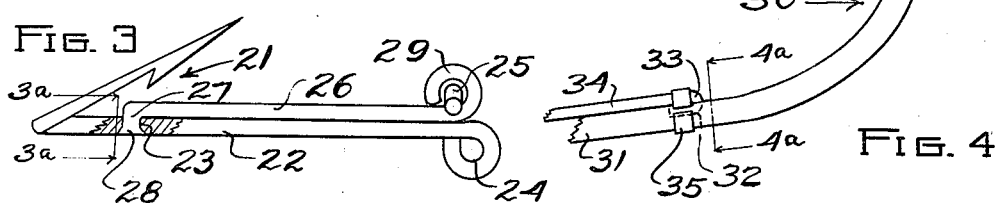
Fig. 3 shows an elevation of a modified form of the invention, partly in section.
Fig. 4 shows another modification of the invention in elevation.

Fig. 3 shows a hook assembly 21 having a shank 22 which is perforated at 23 and has an eyelet 24 and clasp extension 25. Parallel with the shank is mounted a tang 26 having an angled portion 27 which fits into the perforation 23 and is flared or spread at 28 as shown so that it will remain secured to the shank. The other end of the tang 26 is provided with an eyelet 29 designed to receive the hook 25 so that the tang can be securely locked against the shank 22 when the bait has been inserted between it and the tang.

Fig. 4 shows a hook 30 having a shank 31 with an indentation 32 to receive a portion of the curved end 33 of a tang 34. In order to hold the curved end 33 positioned in the indentation 32, a strong metallic band 35 is machined pressed around the shank end of the tang to hold the two snugly and securely together.

The indentation 32 prevents the tang from being twisted, turned or loosened from the hook. The band 35 may, if desired, be slightly embedded into the tang and hook so as to insure their relative positions.

Figure 5:
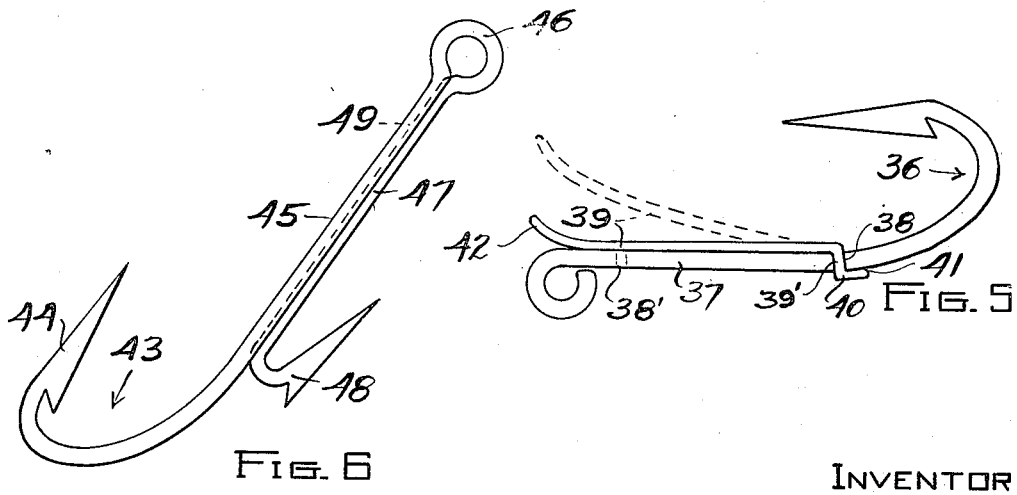
Fig. 5 shows in elevation another modification of the invention.

Fig. 5 shows a hook 36 having a shank 37 with a perforation 38 which receives an angled end 39' of a tang 39. The angled end 39' of the tang passes through the perforation 38 and has a leg 40 which is bent at right angles thereto to snugly engage the side of the shank 37. The leg 40 may be welded or soldered as at 41. The other end of the tang is provided with a curved portion 42 to provide a finger lift for the tang so that it can easily be forced from the side of the hook. An additional hole 38' is provided near the eyelet end of the hook so that the tang end 39' can be inserted therein should it be desired.

Figure 6:
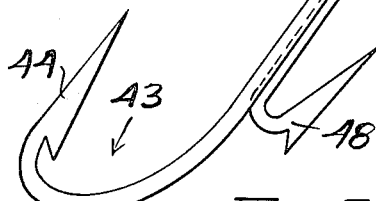
Fig. 6 shows an elevation of still another modification.

Fig. 6 shows a form of the invention including a hook 43 having a barb 44, shank 45, eyelet 46, tang shank 47 and a tang barb 48. In this form, hook and tang are in one integral piece and serve as a double hook. A groove 49 is provided in the shank of the hook to accommodate the shank of the tang as shown. The barb of the tang is correctly angled so as to provide a finger lift for separating shanks 45 and 47 to receive the bait.

Figs. 7 and 8 show a hook 50 having a barb 51, shank 52 and an eyelet 53. The shank on opposite sides is provided with grooves 54 and 55 which at both ends thereof is provided with perforations 56 and 57. A tang 58 is provided having a hooked finger lift end 59 and a turned end having portions 60 and 61. The arms 60 and 61 are pressed into the configuration shown after first being passed through either eye or hole 57 or 56. It is apparent that the tang 58 can be inserted into and fixed at either hole 56 or 57 and that the tang can be placed in either groove on either side of the hook.

The form shown in Figs. 9, 10 and 11 comprise a fish hook 62 having a shank 63 and an eyelet 64 at one end thereof. A groove 65 is provided to accommodate the shank 66 of a tang which has a curved end 67 and an angled end 68. One end of the groove 65 is enlarged as shown at 69 so that the angled end of the tang can be placed therein and securely held in position as by welding, soldering or any other suitable way. The purpose of this angled end is to prevent the tang from twisting or being distorted with respect to the shank of the hook when it is sprung to and from the hook in order to receive the bait. Such a construction allows the use of less solder than where the angle is omitted, without sacrificing strength and utility.

In this form of the invention, the tang is preferably made of spring steel and is securely anchored in the space 69 so that when the end 67 is pulled from the hook, it will automatically snap back when it is released; the tension being sufficient to securely hold any bait placed within the gap between the tang and hook.

Figs. 12 and 13 show a fish hook 70 embodying applicant's invention and comprises a shank 71, barb 72 and eyelet 73. Either end of the shank may be sliced or indented as shown at 74 to receive an angled end 75 of a tang 76 which is provided with a hook 77 to be clasped to one end of the shank. The angled end 75 is of proper thickness and shape so that it can be forced into the cut 74 by high pressure and be frictionally held therein. Soldering or welding may be resorted to, however, should a stronger joint be desired.

Having thus described my invention, what is claimed as new and desired to be secured by Letters Patent is:

1. In combination, a hook and a tang, the tang having one end thereof bent, and the hook having a groove to receive said bent end of the tang for fixation thereto.

2. In a combination device, a hook element and a tang element joined together in parallel relation, an elongated groove in one of said elements adapted to receive substantially the entire portion of the other element.

3. The device recited in claim 2, one of said elements having recessed means to snugly receive the end of the other element for urging them in to parallel relation.

4. In a fish hook device, a hook having a shank, a perforation in said shank materially removed from the center and ends thereof, and adapted to receive a tang in resilient engagement with the shank.

5. In a fishing device, a hook element and a tang element, cut-out means in one of the elements removed from the ends thereof for holding the other element in resilient relation thereto in a manner to receive and hold live bait between them.

6. In a fish hooking device, a hook having a shank with means at one end for attachment to a fish line and curved means at the other end having a barb, a groove extending along a major portion of the length of the shank, a tang parallel with the shank and extending substantially the full length thereof between said means, a cut-out near one end of the shank adapted to receive an end of the tang and hold it in resilient relation with the shank of the hook.

7. In a fish hook device, a shank having a hook at one end and means at the other for attachment to a fish line, a groove extending the major length of the shank, cut-out means in the shank removed from the ends thereof but near one end of the groove, a tang parallel with the shank and having one end thereof anchored in the said means, said shank and tang being adapted to hold live bait between them.

HARLOW H. HATHAWAY.